United States Patent
Jansen et al.

(10) Patent No.: US 9,366,238 B2
(45) Date of Patent: Jun. 14, 2016

(54) SYSTEM AND PROCESS OF COOLING AN OTEC WORKING FLUID PUMP MOTOR

(71) Applicant: LOCKHEED MARTIN CORPORATION, Bethesda, MD (US)

(72) Inventors: Eugene C. Jansen, Stafford, VA (US); Benjamin S. Balbir, Reistertown, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 154 days.

(21) Appl. No.: 14/199,549

(22) Filed: Mar. 6, 2014

(65) Prior Publication Data

US 2014/0260248 A1 Sep. 18, 2014

Related U.S. Application Data

(60) Provisional application No. 61/778,699, filed on Mar. 13, 2013.

(51) Int. Cl.
*F03G 7/05* (2006.01)

(52) U.S. Cl.
CPC . *F03G 7/05* (2013.01); *Y02E 10/34* (2013.01); *Y02E 10/38* (2013.01)

(58) Field of Classification Search
CPC ............ F03G 7/05; F25B 39/02; Y02E 10/34
See application file for complete search history.

(56) References Cited

U.S. PATENT DOCUMENTS

| | | | |
|---|---|---|---|
| 3,331,216 A | 7/1967 | Rayner | |
| 3,805,547 A | 4/1974 | Eber | |
| 5,513,494 A | 5/1996 | Flynn et al. | |
| 5,642,987 A | 7/1997 | Taricco | |
| 7,735,321 B2 | 6/2010 | Howard | |
| 7,900,452 B2 | 3/2011 | Howard et al. | |
| 8,117,843 B2 | 2/2012 | Howard et al. | |
| 8,146,362 B2 | 4/2012 | Howard et al. | |
| 2008/0314043 A1 | 12/2008 | Howard et al. | |

(Continued)

FOREIGN PATENT DOCUMENTS

| | | |
|---|---|---|
| CA | 993208 | 7/1976 |
| CN | 102213199 | 3/2013 |

(Continued)

OTHER PUBLICATIONS

International Search Report for application No. PCT/US2014/021860, dated Jun. 25, 2014 (3 pages).

(Continued)

*Primary Examiner* — Audrey K Bradley
(74) *Attorney, Agent, or Firm* — Withrow & Terranova, P.L.L.C.

(57) ABSTRACT

A cooling system and process in an OTEC system are described where the sub-cooled working liquid from the working fluid pump outlet is used to cool the working fluid pump motor, either directly or indirectly via heat exchange with a secondary fluid. The heat from the motor that is being rejected into the working fluid just prior to the working fluid flowing to the evaporator helps to alleviate heat duty in the evaporator meaning more potential for the evaporator to create energy. Also, because two-phase evaporators, such as those in an OTEC system, are less efficient than single-phase heat exchangers at single-phase heating, this pre-heating of the working fluid will help the evaporator performance substantially.

11 Claims, 2 Drawing Sheets

(56) References Cited

U.S. PATENT DOCUMENTS

| | | | |
|---|---|---|---|
| 2010/0024422 A1* | 2/2010 | Henderson | .................. 60/641.8 |
| 2011/0120126 A1 | 5/2011 | Srinivasan | |
| 2011/0173978 A1 | 7/2011 | Rekret et al. | |
| 2011/0173979 A1 | 7/2011 | Krull et al. | |
| 2012/0125561 A1 | 5/2012 | Levings et al. | |
| 2013/0042612 A1 | 2/2013 | Shapiro et al. | |
| 2013/0042613 A1 | 2/2013 | Ross et al. | |
| 2013/0042996 A1 | 2/2013 | Hwang et al. | |

FOREIGN PATENT DOCUMENTS

| | | | |
|---|---|---|---|
| DE | 10231211 | | 2/2003 |
| JP | 04-000237 | | 1/1992 |
| JP | 04-317533 | | 11/1992 |
| JP | 04-317543 | | 11/1992 |
| JP | 05-340342 | | 12/1993 |
| JP | 2012-225177 | | 11/2012 |
| JP | 2012225177 A | * 11/2012 | ............. F01K 17/04 |
| WO | 2011/028402 | | 3/2011 |
| WO | 2012/121605 | | 9/2012 |

OTHER PUBLICATIONS

Written Opinion for application No. PCT/US2014/021860, dated Jun. 25, 2014 (8 pages).
M.A. Wurm et al., "Ram Water Ocean Thermal Energy Conversion Heat Exchanger Concept," published at ip.com as publication No. IPCOM000220896D, dated Aug. 14, 2012 (2 pages).
R.H. Yeh at al., "Maximum output of an OTEC power plant," Ocean Engineering, vol. 32 (2005), p. 685-700.
D. Bharathan, "Staging Rankine Cycles Using Ammonia for OTEC Power Production," National Renewable Energy Laboratory Technical Report NREL/TP-5500-49121, Mar. 2011 (18 pages).
International Preliminary Report on Patentability for U.S. Appl. No. PCT/US2014/021860, mailed Sep. 24, 2015, 10 pages.
1 Patent Acts 1977: Search Report Under Section 17(5) for U.K. Patent Application No. GB1404272.5, mailed Oct. 10, 2014, 3 pages.

* cited by examiner

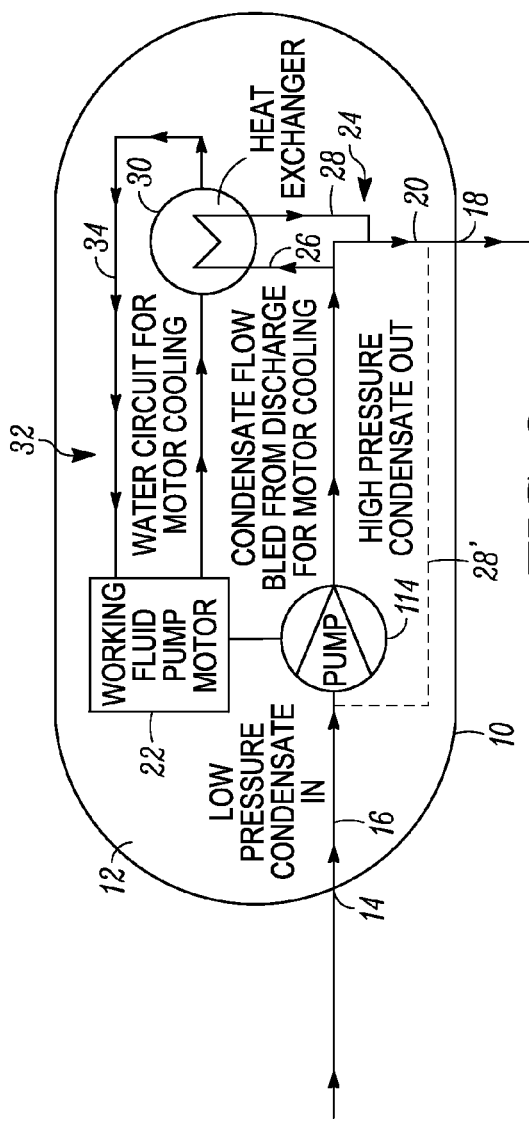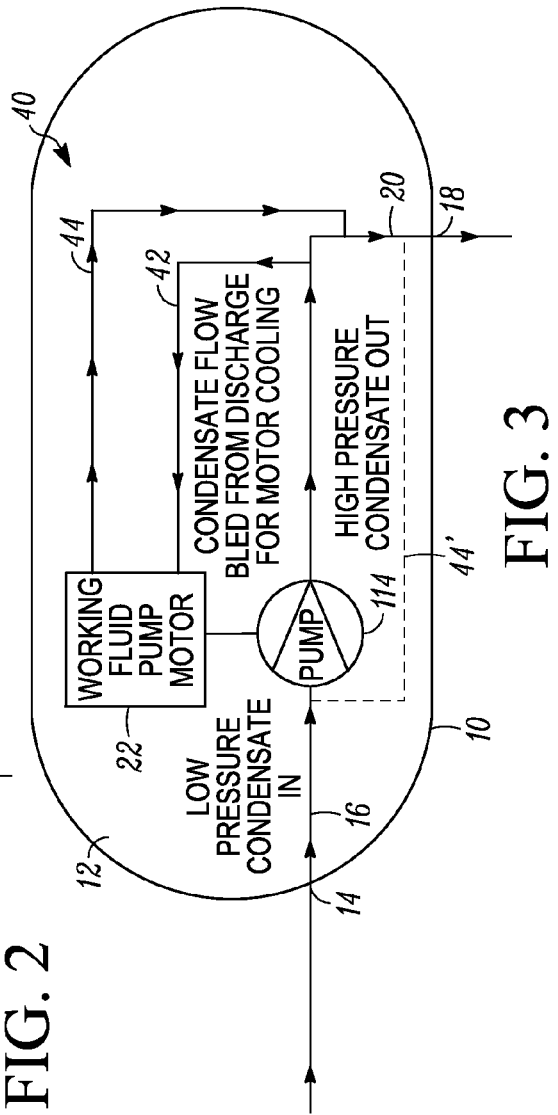

and the motor.
SYSTEM AND PROCESS OF COOLING AN OTEC WORKING FLUID PUMP MOTOR

FIELD

This disclosure relates to an ocean thermal energy conversion (OTEC) system, and to cooling a working fluid pump motor used in the OTEC system.

BACKGROUND

In a conventional OTEC system, many components are located below the water line. One such component is the working fluid condenser heat exchanger. Due to net positive suction head required, the working fluid pumps must be located below the condensers, and so the working fluid pumps must also be located below the water line.

Commercial Off The Shelf (COTS) working fluid pumps are not available for water submergence. As a result, the working fluid pump(s) must be located inside a pressure vessel to isolate the pump(s) from the ocean environment and pressure differences. This complicates heat dissipation. Heat must be dissipated from the motor to keep the major working components, such as motor windings, seals, bearings and lubricant, cool.

The inefficiency of the motor (nominally 5%) will be directly converted to mechanical work in the form of heat. This heat must be extracted at the rate it is produced. Furthermore, the motor temperature cannot exceed a certain temperature, generally 40 degrees Celsius. One solution is to use the sea water surrounding the pressure vessel as the heat sink. Unfortunately, the pressure vessel may not account for enough surface area to rely on air convection on the inside of the pressure vessel and natural sea water convection on the outside of the pressure vessel. Even if water is forced around the vessel to create forced convection while air is circulated to create forced convection on the inside of the pressure vessel, enough heat may not dissipate quickly enough to sufficiently cool the motor.

Another option is to use sea water that is pumped through a heat exchanger located inside the pressure vessel or located outside the pressure vessel in order to cool the motor. Unfortunately, this option requires a sea water inlet and a sea water outlet (in the case of an internal heat exchanger), or an additional working fluid inlet and outlet to the heat exchanger (in the case of an external heat exchanger), a sea water filter (failure point), an additional pump (failure point), additional seals (failure points), and uses sea water directly, which is highly corrosive (increases failure potential).

SUMMARY

A cooling system and process in an OTEC system are described where the sub-cooled working liquid from the working fluid pump outlet is used to cool the working fluid pump motor, either directly or indirectly via heat exchange with a secondary fluid.

In one embodiment, direct cooling can include passing the working fluid through the jacket of the motor for direct forced convection cooling, as shown in FIG. 3. In one embodiment, indirect cooling can include either working fluid to air heat exchange or working fluid to secondary liquid, such as fresh water, heat exchange. With air, the heat exchanger would exchange heat between the air in the pressure vessel and the working fluid. With a secondary liquid, the heat exchanger would exchange heat between the secondary liquid passing through the motor water jacket and the working fluid as shown in FIG. 2.

The working fluid for cooling would be taken from the high pressure side of the working fluid pump outlet, passed through the heat exchanger or directly to the motor, and then either be reintroduced into the pump outlet to continue on to the evaporator with a certain amount of de-subcooling, or the working fluid can be introduced back into the cooling loop prior to the pump inlet. The de-subcooling option would allow some amount of subcool to be taken out of the working fluid thereby alleviating heat that would otherwise come from the evaporator. Also, because the evaporator is designed as a two-phase heat exchanger, working fluid with less subcooling is evaporated more efficiently. Therefore, heat energy that would otherwise be wasted on both sides of the system is put back into the system for net benefit.

In one embodiment, a pump system is provided that includes a pressure vessel defining an interior space containing air or an inert gas such as nitrogen, a fluid inlet into the interior space and a fluid outlet from the interior space. A pump is disposed within the interior space, with the pump having an inlet fluidly connected to the fluid inlet of the pressure vessel and an outlet fluidly connected to the fluid outlet of the pressure vessel. In addition, a motor is disposed within the interior space and connected to the pump for driving the pump. A motor cooling flow path is disposed within the interior space and in heat exchange relationship with the motor. The motor cooling flow path includes an inlet portion that is fluidly connected to the pump outlet to receive fluid from the pump outlet and an outlet portion that is fluidly connected to the pump outlet or the pump inlet.

In another embodiment, an ocean thermal energy conversion system is provided that includes a working fluid circuit that includes a condenser, an evaporator, a working fluid pump, and a closed loop conduit interconnecting the condenser, the evaporator and the working fluid pump. A two-phase working fluid is in the working fluid circuit. The working fluid pump, the evaporator and the condenser are disposed under the surface of a body of water, and the working fluid pump is disposed within a pressure vessel that defines an interior space containing air or an inert gas such as nitrogen, a fluid inlet into the interior space that is fluidly connected to the closed loop conduit, and a fluid outlet from the interior space that is fluidly connected to the closed loop conduit. The pump has an inlet fluidly connected to the fluid inlet of the pressure vessel and an outlet fluidly connected to the fluid outlet of the pressure vessel. A motor is disposed within the interior space and is connected to the pump for driving the pump. In addition, a motor cooling flow path is disposed within the interior space and in heat exchange relationship with the motor. The motor cooling flow path includes an inlet portion that is fluidly connected to the pump outlet to receive working fluid from the pump outlet and an outlet portion that is fluidly connected to the pump outlet or the pump inlet.

In another embodiment, in an ocean thermal energy conversion system, a method of cooling a pump motor that drives a pump is provided, where the pump and the pump motor are disposed within an interior space of a pressure vessel that is disposed under the surface of a body of water, and the pump pumps a two-phase working fluid. In the method, within the interior space of the pressure vessel, working fluid is directed from an outlet of the pump to exchange heat with the pump motor, and after exchanging heat with the pump motor, the working fluid is directed back into the pump outlet or into an inlet of the pump.

DRAWINGS

FIG. 2 illustrates an example of an indirect pump motor cooling system.

FIG. 3 illustrates an example of a direct pump motor cooling system.

DETAILED DESCRIPTION

Figure 1:
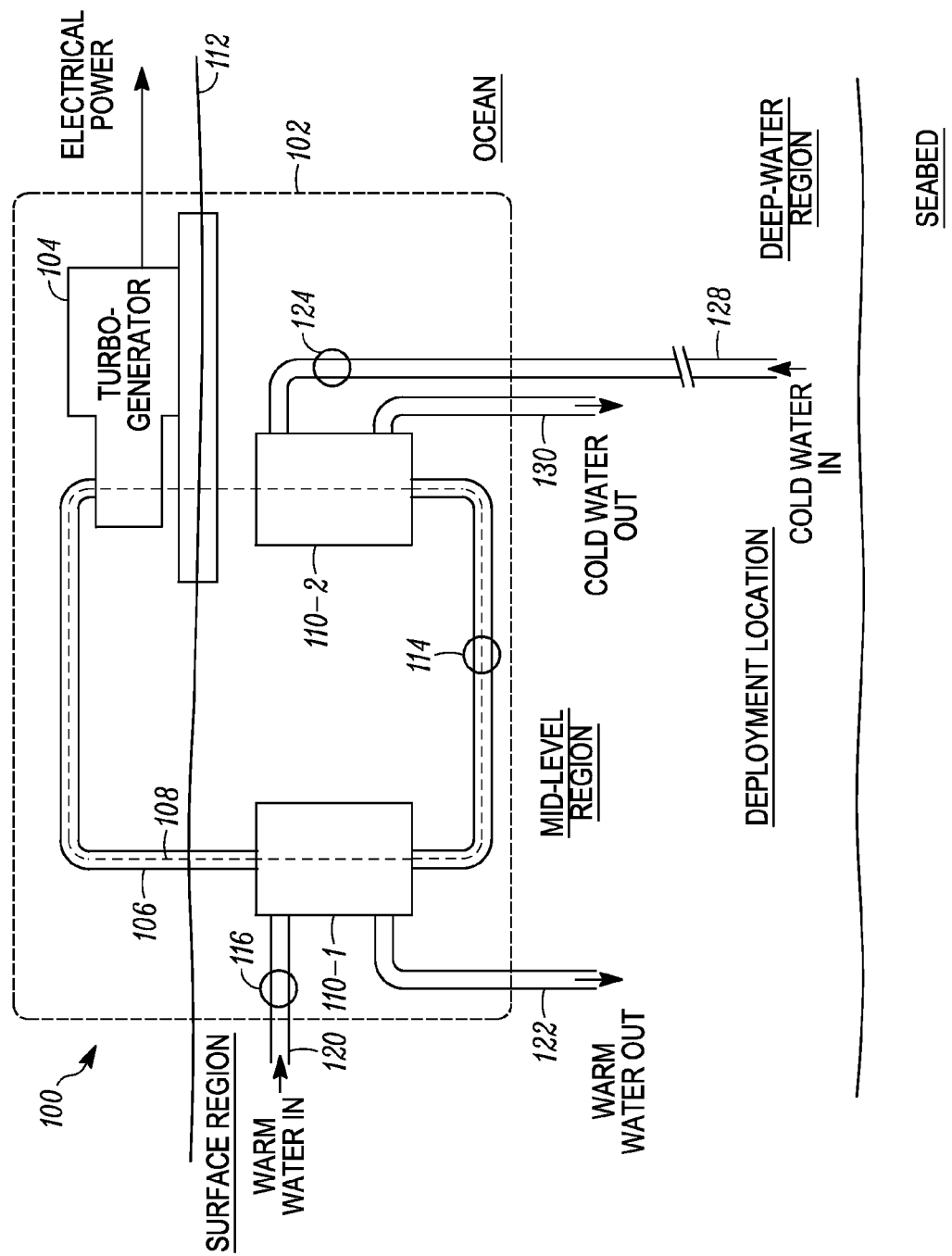
FIG. 1 illustrates an OTEC system that can employ the pump motor cooling system described herein.

A cooling system and process in an OTEC system are described where the sub-cooled working liquid from the working fluid pump outlet is used to cool the working fluid pump motor, either directly or indirectly via heat exchange with a secondary fluid.

FIG. 1 is a schematic diagram of the layout of an OTEC power generation system 100. The overall construction and operation of an OTEC system is well known to those of ordinary skill in the art. The OTEC system 100 can be deployed in any suitable body of water such as an ocean, sea, a salt or fresh water lake, etc.

In this embodiment, the system 100 includes an offshore platform 102, a turbogenerator 104, a working fluid circuit that includes an evaporator 110-1, a condenser 110-2, a working fluid pump 114, and a closed-loop working fluid conduit 106 that fluidly interconnects the condenser, the evaporator and the working fluid pump and that also extends through the turbogenerator 104. A two-phase working fluid 108, for example but not limited to ammonia, is contained in the working fluid circuit. The system 100 further includes seawater pumps 116 and 124, and fluid conduits 120, 122, 128, and 130.

As indicated in FIG. 1, the working fluid pump 114, the evaporator 110-1 and the condenser 110-2 are disposed under the surface 112 of a body of water, which can be an ocean, a sea, a fresh water lake and the like.

The evaporator 110-1 can be of conventional construction and includes a heat exchanger that is configured to transfer heat from warm seawater at the surface region into the working fluid 108 thereby inducing the working fluid to vaporize. The condenser 110-2 can also be of conventional construction and includes a heat exchanger that is configured to transfer heat from vaporized working fluid 108 to cold seawater from the deep-water region thereby inducing condensation of vaporized working fluid 108 back into liquid form.

With reference to FIG. 2, the working fluid pump 114 is disposed within a pressure vessel 10 that defines an interior space 12 containing air or an inert gas such as nitrogen. The vessel 10 includes a working fluid inlet 14 into the interior space 12 with a fluid conduit 16 inside the vessel that is fluidly connected to the closed loop conduit 106 and to an inlet of the pump. The inlet 14 and the fluid conduit 16 direct low pressure working fluid from the condenser 110-2 into the vessel 10 and the pump inlet. In addition, the vessel 10 includes a working fluid outlet 18 from the interior space with a fluid conduit 20 inside the vessel that is fluidly connected to the closed loop conduit 106 and to the outlet of the pump. The outlet 18 and the fluid conduit 20 direct high pressure working fluid from the pump into the closed loop conduit 106 where it flows to the evaporator 110-1.

A working fluid pump motor 22 is disposed within the interior space 12 and is connected to the pump 114 for driving the pump. In the embodiment illustrated in FIG. 2, a motor cooling flow path 24 is disposed within the interior space 12 and is in indirect heat exchange relationship with the motor 22. The motor cooling flow path 24 includes an inlet portion 26 that is fluidly connected to the pump outlet via the fluid conduit 20 to receive working fluid from the pump outlet and an outlet portion 28 that is fluidly connected to the pump outlet via the fluid conduit 20. The motor cooling path 24 extends through a heat exchanger 30 with the inlet portion 26 directing working fluid to the heat exchanger 30 and the outlet portion 28 directing working fluid from the heat exchanger 30.

In this example, the heat exchanger 30 is part of a liquid cooling circuit 32 disposed within the pressure vessel 10. The cooling circuit 32 includes a closed loop cooling liquid flow path 34 containing a cooling liquid, such as clean water, between the heat exchanger 30 and the interior of the motor 22. The liquid in the flow path 34 picks up heat from the motor components needing to be cooled. The heated liquid is then directed to the heat exchanger 30 where the liquid exchanges heat with the working fluid in the flow path 24. The cooled liquid is then returned back to the motor 22 to continue the cycle.

The working fluid being returned via the outlet portion 28 is heated in the heat exchanger 30. Because heat is rejected to the working fluid just prior to the evaporator 110-1, the heat duty in the evaporator is reduced which means more potential for the evaporator to create energy. Also, because 2-phase evaporators, such as those in an OTEC system, are less efficient than single-phase HXs at single-phase heating, this pre-heating of the working fluid prior to the evaporator will help the evaporator performance substantially.

Instead of the outlet portion 28 returning the working fluid back to the pump outlet, the outlet portion 28 can return the working fluid to the inlet of the pump 114 via the conduit 16 as shown in dashed line 28' in FIG. 2.

In addition, although the working fluid is described and illustrated in FIG. 2 as exchanging heat in the heat exchanger with the liquid cooling circuit 32, other cooling options are possible. For example, the liquid cooling circuit 32 can be eliminated, and the working fluid flowing through the heat exchanger 30 can exchange heat with the air or inert gas within the interior space 12 of the vessel. Heat can be dissipated from the motor 22 via forced circulation/convection to the air or inert gas within the vessel. The heated air/inert gas is then cooled via the heat exchanger 30.

FIG. 3 illustrates an embodiment that includes a motor cooling flow path 40 that is disposed within the interior space 12 and is in direct heat exchange relationship with the motor 22. The motor cooling flow path 40 includes an inlet portion 42 that is fluidly connected to the pump outlet via the fluid conduit 20 to receive working fluid from the pump outlet and an outlet portion 44 that is fluidly connected to the pump outlet via the fluid conduit 20. In this embodiment, the inlet portion 42 directs the working fluid directly to the motor where the working fluid is used to directly cool the motor components. The outlet portion 44 returns the working fluid back to the pump outlet where the working fluid continues on to the evaporator.

Instead of the outlet portion 44 returning the working fluid back to the pump outlet, the outlet portion can return the working fluid to the inlet of the pump 114 via the conduit 16 as shown in dashed line 44' in FIG. 3.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of increasing performance of a two-phase evaporator that evaporates a two-phase working fluid that is pumped to the two-phase evaporator by a pump driven by a pump motor, comprising:
    directing a portion of the two-phase working fluid from an outlet of the pump through a heat exchanger to exchange heat with a liquid cooling circuit disposed within a pressure vessel and that is in direct heat exchange relationship with the pump motor, the pump and the pump motor being disposed within an interior space of the pressure vessel that is disposed under the surface of a body of water; and
    after exchanging heat with the pump motor, directing the portion of the two-phase working fluid back into the outlet of the pump or into an a pump inlet of the pump prior to the two-phase working fluid flowing to the two-phase evaporator so that the two-phase working fluid that reaches the two-phase evaporator is at an increased temperature.

2. The method claim 1, wherein the evaporator is part of an ocean thermal energy conversion system.

3. The method of claim 2, wherein the two-phase working fluid is ammonia.

4. The method of claim 2, comprising:
    after exchanging heat with the motor, directing the two-phase working fluid back into the pump outlet.

5. A pump system, comprising:
    a pressure vessel defining an interior space containing air or an inert gas, a fluid inlet into the interior space and a fluid outlet from the interior space;
    a pump disposed within the interior space, the pump having a pump inlet fluidly connected to the fluid inlet of the pressure vessel and a pump outlet fluidly connected to the fluid outlet of the pressure vessel;
    a motor disposed within the interior space and connected to the pump for driving the pump; and
    a motor cooling flow path disposed within the interior space and in indirect heat exchange relationship with the motor, the motor cooling flow path including an inlet portion that is fluidly connected to the pump outlet to receive fluid from the pump outlet and an outlet portion that is fluidly connected to the pump outlet or to the pump inlet.

6. The pump system of claim 5, further comprising a liquid cooling circuit disposed within the pressure vessel, the liquid cooling circuit including a heat exchanger that is in heat exchange relationship with the motor cooling flow path.

7. The pump system of claim 5, further comprising a heat exchanger in the pressure vessel that is in heat exchanging relationship with the air or inert gas inside the pressure vessel, and heat from the motor is dissipated into the air or inert gas.

8. The pump system of claim 5, wherein the pressure vessel is disposed under the surface of a body of water, and the pump is configured to pump a two-phase fluid.

9. The pump system of claim 8, wherein the two-phase fluid is ammonia.

10. An ocean thermal energy conversion system, comprising:
    a working fluid circuit that includes:
        a pressure vessel defining an interior space containing air or an inert gas, a fluid inlet into the interior space, and a fluid outlet from the interior space;
        a pump disposed within the interior space, the pump having a pump inlet fluidly connected to the fluid inlet of the pressure vessel and a pump outlet fluidly connected to the fluid outlet of the pressure vessel;
        a motor disposed within the interior space and connected to the pump for driving the pump; and
        a motor cooling flow path disposed within the interior space and in indirect heat exchange relationship with the motor, the motor cooling flow path including an inlet portion that is fluidly connected to the pump outlet to receive fluid from the pump outlet and an outlet portion that is fluidly connected to the pump outlet or to the pump inlet;
        a condenser;
        an evaporator; and
        a closed loop conduit interconnecting the condenser, the evaporator and the pump;
    a two-phase working fluid in the working fluid circuit;
    the pump, the evaporator and the condenser are disposed under the surface of a body of water;
    the fluid inlet is fluidly connected to the condenser by the closed loop conduit, and the fluid outlet is directly fluidly connected to the evaporator by the closed loop conduit.

11. The ocean thermal energy conversion system of claim 10, wherein the evaporator is a 2-phase evaporator.

* * * * *